B. W. BURTSELL.
GEAR.
APPLICATION FILED SEPT. 23, 1912.

1,146,306.

Patented July 13, 1915.

WITNESSES
Milo L. Bailey
LeRoi J. Williams

INVENTOR
Bertram W. Burtsell.
by Milton Tibbetts,
Attorney

UNITED STATES PATENT OFFICE.

BERTRAM W. BURTSELL, OF DETROIT, MICHIGAN, ASSIGNOR TO PACKARD MOTOR CAR COMPANY, OF DETROIT, MICHIGAN, A CORPORATION OF MICHIGAN.

GEAR.

1,146,306.  Specification of Letters Patent.  Patented July 13, 1915.

Application filed September 23, 1912. Serial No. 721,825.

*To all whom it may concern:*

Be it known that I, BERTRAM W. BURT-SELL, a citizen of the United States, and resident of Detroit, Wayne county, State of Michigan, have invented certain new and useful Improvements in Gears, of which the following is a specification.

This invention relates to gears and particularly to that type of gears in which the teeth are composed of both a metallic and a non-metallic substance.

More particularly the invention relates to gears in which the operating portion of the teeth is composed of a series of layers of cambric or other cloth or woven substance.

One of the objects of the invention is to produce a gear of the above description, which will be simple in construction and inexpensive to manufacture.

Figure 2:
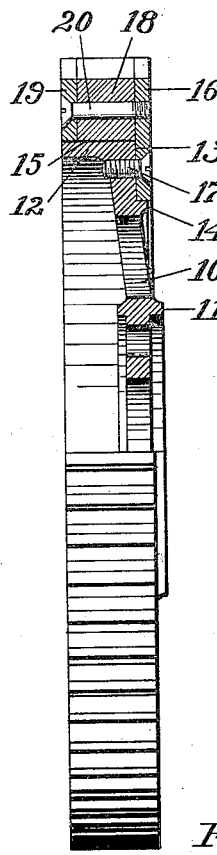
Figure 1:
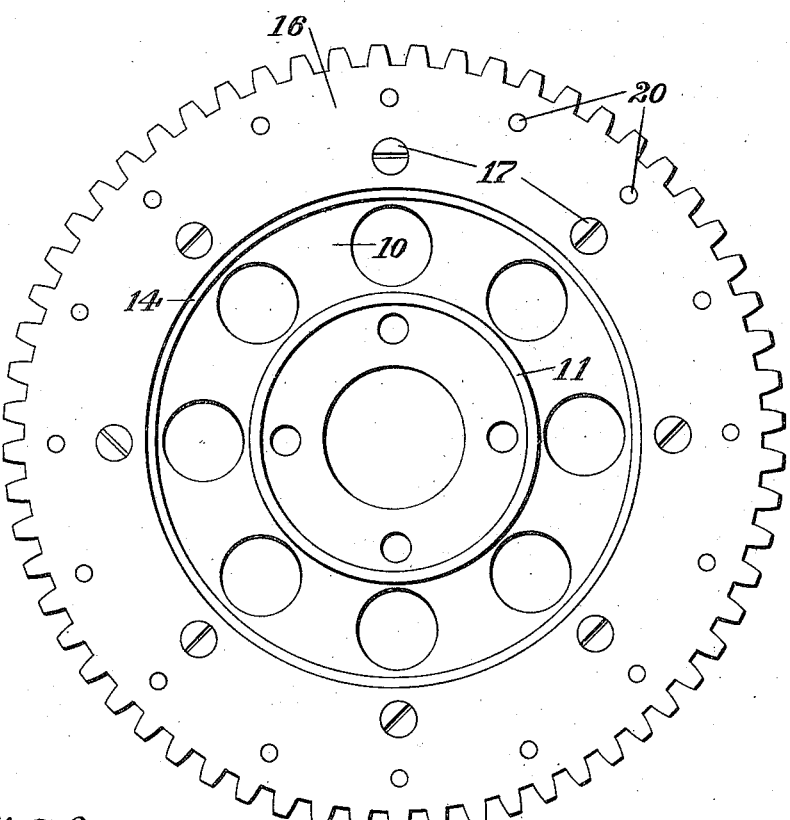
Figure 3:
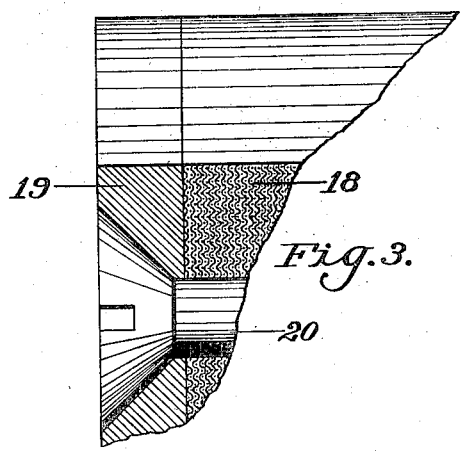

The invention will be described in detail, in connection with the drawings which form a part of this specification, and in which, Figure 1 is a side view of a gear made according to this invention; Fig. 2 is a transverse section and part end view of the gear shown in Fig. 1; and Fig. 3 is an enlarged fragmentary section.

The primary object of making gear teeth of non-metallic material is to obtain quietness in the action of the gears, particularly at high speed, so that it also becomes necessary in the making of these gears that they should be as nearly perfect in form as it is possible for design and machinery to make them. Hence the importance of having the teeth of the gear absolutely concentric and true.

Referring to the drawings, the body of the gear comprises a rim portion 12 and a web portion 10, by which it is secured to its operating shaft and centered thereon by a concentric flange 11. In the gear shown, this rim portion is faced off on one side, as shown at 13, which faced portion is bounded internally by a flange 14, which is concentric with the flange 11. The periphery 15 of the rim 12 is also concentric with the flange 11, and of course all of these surfaces and flanges are machined in one operation, so that they are as nearly mechanically true as it is possible to make them.

A disk or plate 16 fits accurately against the surface 13, and is positioned on the gear by the positioning flange 14, and this plate is secured to the gear body, as by a series of screws 17.

The layers of material comprising the actual working portion of the teeth are then layed against the plate 16 and surrounding the rim 12, and in the present showing, these layers consist of cambric or other suitable cloth or woven material, and are indicated at 18. Cambric has been found to be particularly desirable, because it holds its shape and is easily handled both in the stamping operation, by which the center is cut out and the piece cut to the required shape of the gear, and in assembling on the gear rim, and because after the teeth are cut in it and the gear is operated in oil or other lubricating substance, there is no tendency to swell or shrink. Also this material has exceptional wearing qualities.

After sufficient layers of cambric or other suitable material have been laid against the plate 16 and surrounding the rim 12, another disk or plate 19, having its center cut away so that it fits the periphery of the rim 12, is placed against the cloth layers. By means of a hydraulic press or similar device, the plates are then pressed together under a pressure of several thousand pounds to the square inch, and means for clamping the plates are provided in the form of screws or bolts 20. As the material 18 is of a more or less compressible nature, it is obvious that with the same pressure for each gear manufactured, the distance between the plates 16 and 19 would not always be exactly uniform, and in the construction shown, this slight lack of uniformity is not noticeable, by reason of the plate 19 sliding on the periphery of the rim 12. Thus the pressure on the material 18 is always uniform and if the same number of layers of material are used, the width of the gears varies only slightly.

Having thus described my invention, what I claim and desire to secure by Letters Patent, is,

1. A gear comprising a body portion having a rim, said rim having a plane side surface and an annular flange at the base thereof, an annular plate secured to said body portion with its side against said plane surface and concentrically positioned by said flange, a series of layers of compressible non-metallic material surrounding said rim and positioned against said plate, a second annular plate surrounding said rim and concentrically positioned thereby, and bolts for compressing and clamping said material between said plates on the periphery of said rim.

2. A gear comprising a body portion having a rim, said rim having inner and outer cylindrical plate positioning surfaces concentric with each other and with the axis of the gear, an annular plate secured to the body portion and positioned thereon by the inner said surface, a ring of non-metallic compressible material surrounding said rim, and positioned against said plate, a second annular plate surrounding said rim and positioned thereon by the outer said surface, and bolts for compressing and clamping said material between said plates on the periphery of said rim.

In testimony whereof I affix my signature in the presence of two witnesses.

BERTRAM W. BURTSELL.

Witnesses:
CLARENCE F. TALLZIEN,
FRANCIS H. MAISONVILLE.